United States Patent [19]

Langstroth

[11] 4,018,246

[45] Apr. 19, 1977

[54] LINE TAP VALVE

[75] Inventor: Hall Langstroth, Coral Cables, Fla.

[73] Assignee: Watsco, Inc., Liechtenstein

[22] Filed: June 2, 1975

[21] Appl. No.: 582,853

[52] U.S. Cl. ............................... 137/318; 285/197; 285/287

[51] Int. Cl.² .................................... F16K 43/00

[58] Field of Search ............ 137/317, 318; 138/94; 285/197, 287

[56] References Cited

UNITED STATES PATENTS

| | | | |
|---|---|---|---|
| 2,414,911 | 1/1947 | Temple | 137/318 |
| 2,725,721 | 12/1955 | Gruber | 137/318 |
| 3,024,044 | 3/1962 | Benevento | 137/318 |
| 3,198,206 | 8/1965 | O'Brien | 137/318 |
| 3,428,075 | 2/1969 | Wagner | 137/318 |
| 3,649,055 | 3/1972 | Nilsen | 285/197 |
| 3,732,886 | 5/1973 | Mullins | 137/318 |

Primary Examiner—Martin P. Schwadron
Assistant Examiner—G. L. Walton
Attorney, Agent, or Firm—Ernest H. Schmidt

[57] ABSTRACT

A line tap valve having a body portion integrally formed with opposed leg portions defining a saddle for the reception of a line to be tapped and bendable into embracing relation about the line to retain it securely in place during soldering or brazing, the line tap valve further comprising piercing needle mechanism separable from the body portion during the soldering or brazing operation, but adapted to be permanently assembled thereto after such soldering or brazing by a body screw-on cap and associated flare mechanism operative to simultaneously pierce the line and swadge a retaining ring for securing the piercing needle mechanism in place.

9 Claims, 6 Drawing Figures

LINE TAP VALVE

This invention relates to self tapping line tap valves of the type used for tapping tubular conduits or lines conducting fluids under pressure, such as refrigeration lines.

In U.S. Pat. No. 3,428,075, issued Feb. 18, 1969, there is described a line tube piercing valve assembly having a single enclosure for the piercing needle and for flow communication with the tapped line and in which the piercing needle is spring-urged away from the line into sealing contact with a gasket. The present invention is directed to improvements in such line tap valves.

The principal object of this invention is to provide a novel and improved line tap valve wherein the valve body is permanently attached to the line to be tapped by brazing or silver soldering prior to the assembly of the piercing needle mechanism, and wherein the piercing needle mechanism comprises an integrally formed needle member which, after piercing of the line has been effected, serves as a spring-pressed valve head member operative to seal the line until such time as the valve is used for the discharge or adding of fluid to the line, or for the measurements of line pressures.

It is another object of this invention to provide a line tap valve of the character described including means controlled by the tightening of a screw-on valve cap upon the valve body for permanently attaching the piercing needle mechansim after the valve body has been soldered or brazed to the line to be tapped.

Yet another object of the invention is to provide a line tap valve of the above nature wherein the body is integrally formed with laterally-opposed leg portions defining a saddle for the reception of a line to be tapped, outer ends of which leg portions can readily be bent into embracing relation about the line to retain the line snugly in place during soldering or brazing.

Other objects, features and advantages of this invention will be apparent from the following description when read with reference to the accompanying drawings. In the drawings, wherein like reference numerals denote corresponding parts throughout the several views.

Figure 1:
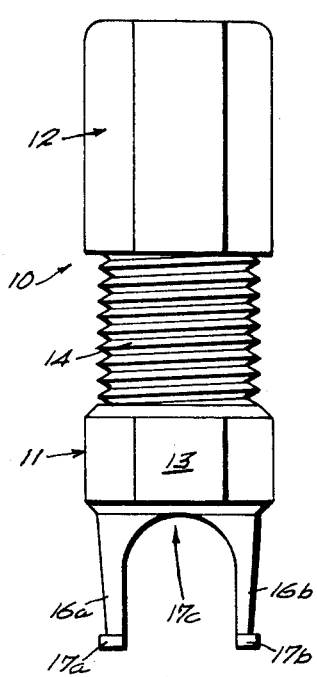
FIG. 1 is a front elevational view of a line tap valve embodying the invention.

Referring now in detail to the drawings, reference numeral 10 designates, generally, a preferred form of line tap valve embodying the invention, the same comprising a valve body member 11 and a valve cap 12, preferably of machined brass. The valve body member 11, which can conveniently be fabricated of hexagonal brass stock, has a central tool-gripping portion 13 of hexagonal cross-sectional shape, which merges at one end with an externally threaded portion 14 terminating in a smooth, relatively short, reduced-diameter ring portion 15. The other end of the central tool-gripping portion 13 is integrally formed with a pair of laterally-opposed leg portions 16a, 16b terminating in laterally outwardly-directed lip portions 17a, 17b, respectively. The leg portions 16a, 16b define a U-shaped recess or saddle 17c adapted to receive seated therein an outer peripheral wall portion of a line to be tapped, as hereinafter more particularly described.

Figure 2:
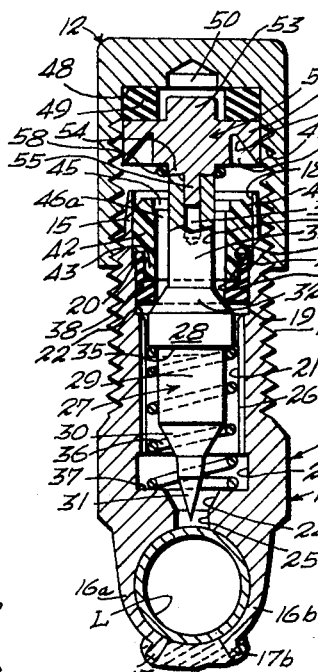
FIG. 2 is a vertical cross-sectional view of the line tap valve illustrated in FIG. 1 shown installed on a tubular line to be tapped and prior to piercing the line for tapping by use of the flare cap assembly.
Figure 4:
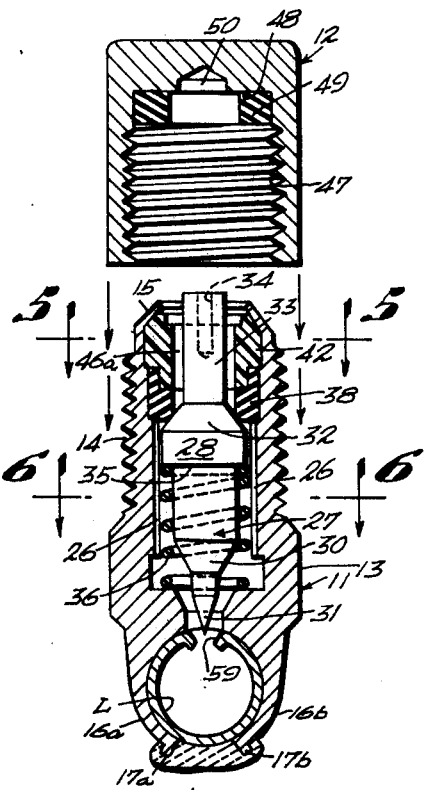
FIG. 4 illustrates in vertical cross-section, the operation of the piercing needle mechanism in sealing the tapped line upon removal of the flare cap and discarding of the flare pin.
Figure 5:
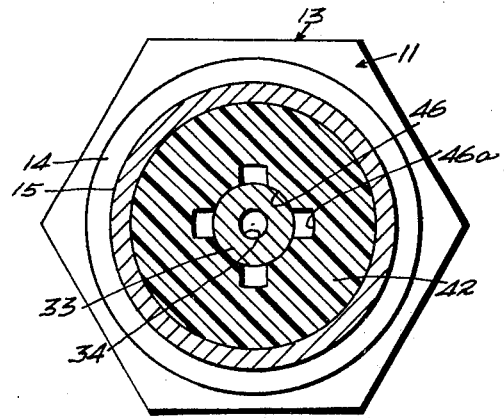
FIG. 5 is a transverse cross-sectional view taken along the line 5—5 of FIG. 4 in the direction of the arrows.
Figure 6:
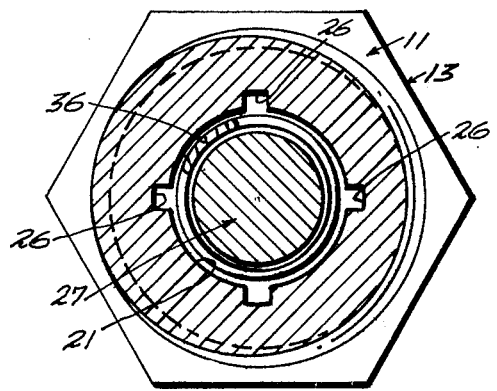
FIG. 6 is a transverse cross-sectional view taken along the line 6—6 of FIG. 4 in the direction of the arrows and illustrating mechanical details.

The valve body member 11, as illustrated in FIG. 2 is provided with a first coaxial bore 18 extending through the ring portion 15 and terminating below the outer end of the externally threaded portion 14 thereof. The first coaxial bore 18 communicates with a second coaxial bore 19 of slightly decreased diameter to define therewith a narrow annular shoulder 20. The second coaxial bore 19 communicates with a third coaxial bore 21 of still further decreased diameter to define therewith an annular shoulder 22. The third coaxial bore 21 extends from about midway along the length of the externally-threaded portion 14 of the valve body member 11 to a zone within the central tool-gripping portion 13 thereof, whereat it opens into a comparatively short fourth coaxial bore 23. The bottom or inner end of the fourth coaxial bore 23 has formed therein a coaxial, frusto-conical opening 24, the inner end of which communicates with a coaxial through bore 25 of still further reduced diameter and which, in turn, opens into the U-shaped recess or saddle 17 defined by the laterally opposed leg portions 16a, 16b. As best illustrated in FIGS. 4 and 6, the third coaxial bore 21 is formed with a plurality of longitudinally extending grooves 26 equidistantly spaced about the inner wall of said bore for the passage of fluid, whether gaseous or liquid, upon use of the line tap valve as hereinafter more particularly described.

Freely receivable within the valve body member 11, as illustrated in FIG. 2, is a needle member 27, which may be machined of stainless steel, for example, and which comprises a central body portion 28 extending at one end into a reduced-diameter, coaxial shank portion 29 the outer end of which merges with a coaxial, frusto-conical abutment portion 30 terminating in a central, piercing needle portion 31.

The opposite end of the central body portion 28 of the needle member 27 merges with a frusto-conical valve head portion 32 extending into a reduced-diameter, coaxial, extension portion 33 having a central flare pin bore 34. The reduced-diameter shank portion 29 of the needle member 27 defines, with the central body portion 28 thereof, an annular shoulder 35 which seats one end of a circumjacent helical compression spring 36. As illustrated in FIG. 2, the lower or outer end of the helical compression spring 36 is adapted to seat against the annular shoulder 37 defined by the juncture of the fourth coaxial bore 23 and the frusto-conical opening 24 formed in the valve body member 11.

Slidingly receivable within the second coaxial bore 19 of the valve body member 11 is a cylindrical gasket 38, which may be of rubber or neoprene synthetic rubber, for example, said cylindrical gasket being formed with a first coaxial opening 39 extending into a second coaxial opening 40 defining therewith an annular shoulder 41.

Slidingly received within the first coaxial bore 18 of the valve body member 11 is a circular bushing 42, which may be fabricated of a tough synthetic plastic material such as Nylon, said bushing being integrally formed with a reduced-diameter end portion 43 interfittingly receivable and seatable within the second coaxial opening 40 of the cylindrical gasket 38. The outer end portion of the bushing 42 is externally chamfered to define a frusto-conical outer wall portion 44. The outer end of the bushing 42 is also formed with a shallow coaxial bore 45 communicating with a reduced-diameter, coaxial, through bore 46 the peripheral wall of which is provided with four equidistantly-spaced, longitudinally-extending recesses 46a for the passage of gas or fluid, as is hereinafter more particularly described.

The valve cap 12 is preferably of hexagonal cross-sectional shape to facilitate screwing and unscrewing in place with an open-end wrench or similar tool, and is formed with coaxial, internal threads 47 for screw-thread reception upon the externally-threaded portion 14 of the valve body member 11. The inside bottom 48 of the valve cap 12 has seated thereagainst an annular gasket 49 for sealing said cap in place upon the valve body member 11 as is hereinafter more particularly described. The inside bottom 48 of the valve cap 12 is also provided with a shallow central bore 50 for the purpose hereinafter appearing.

Means is provided for locking the needle assembly including needle member 28, helical compression spring 36, cylindrical gasket 38 and circular bushing 42 in place within the valve body member 11 upon installation of the line tap valve on a line to be tapped. To this end, a circular flare pin 51 is provided, which may be machined of stainless steel, for example. The flare pin 51 comprises a cylindrical body portion 52 of such external diameter as to fit freely within the valve cap 12 and having at its upper or inner end a reduced-diameter, coaxial abutment portion 53 receivable within the shallow bore 50 of said valve cap, (see FIGS. 2 and 3). The opposite end or underside of the flare pin 51 is integrally formed with an outwardly-extending, coaxial, short extension portion 54 which, in turn, extends into a still further reduced, coaxial pin portion 55 of comparatively greater length. The underside of the body portion 52 of the flare pin 51 is also formed with an annular recess 56 having a bevelled or tapered outer wall 57 terminating substantially at the lower edge of the cylindrical body portion 52 of said flare pin.

As best illustrated in FIG. 2, the short extension portion 54 of the flare pin 51 has circumjacently disposed thereon, and seated against the underside of the cylindrical body portion 52, for the purpose hereinafter described, a small O-ring 58.

Figure 3:
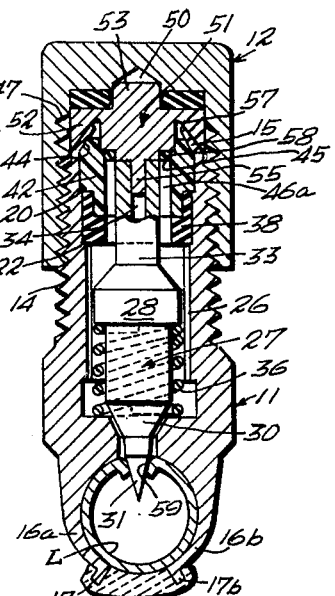
FIG. 3 is a cross-sectional view similar to that of FIG. 2 but showing how the valve needle is depressed for piercing the line by use of the flare cap assembly.

Upon installation of the line tap valve 10, the needle assembly including needle member 28, helical compression spring 36, cylindrical gasket 38 and circular bushing 42 will be removed from the valve body member 11 along with the valve cap 12 and its associated flare pin 51 and O-ring 58. The integral valve body member 11 will then be seated with its U-shaped portion or saddle 17c against an outer peripheral wall portion of a line L of appropriate size to be tapped (see FIG. 2), a suitable solder flux first having been applied to the abutting surfaces. The opposed leg portions 16a, 16b will be pinched or crimped together with a suitable tool so as to snugly embrace the line, whereafter silver solder or the like will be applied with the use of a torch to fix the valve body member 11 in place. After the intense heat thus generated in the valve body 11 has dissipated, the needle assembly including the gasket 38 and busing 42 will be reinserted for the simultaneous piercing of the attached line L and the securement of said needle assembly in place by means of the valve cap 12 and its associated flare pin 51. FIGS. 2 and 3 of the drawings illustrate how this is accomplished by forcefully screwing the valve cap 12 down upon the valve body member 11. As illustrated in FIG. 3, such screw-tightening in place of the valve cap 12 serves to force the needle member 27 downwardly so that its piercing needle portion 31 punctures the line L, as indicated at 59 in FIGS. 3 and 4. With reference to FIG. 3, it will be seen that this force is applied through the flare pin 51, the abutment portion 53 of said flare pin being in seating abutment with the shallow central bore 50 of the valve cap 12, and the shoulder defined by the inner end of the pin portion 55 of said flare pin being in abutment with the outer end of the extension portion 33 of the needle member 27, said pin portion being received within the flare pin bore 34 of said extension portion. At the same time, the tapered outer wall 57 at the underside of the body portion 52 of the flare pin 51, in bearing down upon the outer peripheral surface of the ring portion 15 at the upper end of the valve body member 11, will have served to inwardly crimp or swadge said thin-walled ring peripherally against the frusto-conical wall 44 of the bushing 42 at the upper end of the needle assembly, thereby serving thereafter to retain the needle assembly in place.

During the operation, it will be noted with reference to FIG. 3, that the O-ring 58 will be compressed downwardly within the shallow coaxial bore 45 in the upper end of the bushing 42, thereby sealing off the longitudinally-extending recesses 46a therein to minimize the possibility of leakage of pressurized gas or other fluid in the line L being tapped. After the above-described line piercing and valve body member swadging has been achieved, the valve cap 12 will be removed to separate and permit discarding of the flare pin 51 and its associated O-ring 58, whereupon the compression spring 36 serves to urge the needle member 27 in the upward direction (See FIG. 4) to withdraw its piercing needle portion 38 from the line aperature 59, while at the same time urging the frusto-conical needle head portion 32 in sealing engagement against the valve seat defined by the underside of the gasket 38.

The valve cap 12 will thereafter be screwed in place upon the valve body member 11 to protect the internal mechanism until such time as use is to be made of the valve for withdrawing or adding fluid or gas to the tapped line L. For this purpose a suitable connector fitting including means for pressing down upon the extension portion 33 of the needle member 28 to unseat it with respect to the gasket 38 will permit gas or fluid to flow in either direction through the central openings of the needle assembly including the longitudinally-extending pathways provided by the grooves 26 in the valve body member 11, and the recesses 46a in the busing 42.

While I have illustrated and described herein only one form in which my invention can conveniently be embodied in practice, it is to be understood that this form is presented by way of example only and not in a limiting sense. The invention, in brief, comprises all the embodiments and modifications coming within the scope and spirit of the following claims.

What I claim as new and desire to secure by Letters Patent is:

1. A line tap valve comprising, in combination, an integrally-formed, elongated, valve body member, one end portion of said body member being externally threaded, an internally threaded valve cap member having an inner bottom wall portion and being threadingly receivable on said externally-threaded portion of said body member, said body member, at its threaded end, terminating in a relatively short, reduced-diameter, annular ring portion, the other end portion of said body member extending integrally into a laterally opposed pair of leg portions defining therebetween a semi-circular recess for the transverse seating reception therein of a peripheral outer wall portion of a line to be tapped, said leg portions comprising outwardly-extending leg end portions bendable inwardly about undersurface portions of a seated line to be tapped, said body member being formed with an axial through opening concentric with said reduced-diameter annular ring portion and opening into said recess, a needle mechanism receivable in said through opening for piercing a line to be tapped and thereafter releasably sealing the line, said needle mechanism comprising an elongated needle member having a piercing needle portion at one end operative to enter said recess for piercing a line seated therein for tapping, and means operative upon screwing said valve cap in place on said body member for simultaneously effecting said piercing and sealing and for thereafter retaining said needle mechanism in place within said body member in yieldingly withdrawn position with respect to the pierced line upon subsequent removal of said cap member, said piercing and sealing means comprising a flare pin member removably receivable within said valve cap member, said flare pin member being constrained in abutting relation between said inner bottom wall portion of said valve cap member and the other end of said elongated needle member upon the screwing of said valve cap in place upon said body member, said flare pin member comprising an annular recess defining an annular, tapered outer wall operative, upon the screwing of said valve cap in place upon said body member, to inwardly swadge said annular ring portion into abutting relation against an outer end portion of said needle mechanism for retaining said needle mechanism in place within said body member.

2. A line tap valve as defined in claim 1 wherein said leg end portions terminate in relatively short, laterally outwardly-directed lip portions facilitating gripping by a tool for the bending of said leg end portions into embracing relation about a line to be tapped.

3. A line tap valve as defined in claim 1 wherein said needle mechanism further comprises a helical compression spring within said body member through opening and surrounding said needle member and an annular gasket surrounding said needle member and within said body member through opening, said needle member being formed with a frusto-conical valve head portion seatable in seating relation against the underside of said annular gasket, said helical compression spring comprising means for urging said needle member into sealing relation with respect to said annular gasket.

4. A line tap valve as defined in claim 3 wherein said means for urging said needle member into sealing relation with respect to said annular gasket comprises a first annular shoulder formed along said needle pin and a second annular shoulder formed within said body through opening, said helical compression spring being constrained between said first and second shoulders.

5. A line tap valve as defined in claim 4 wherein said needle mechanism further comprises an annular bushing circumjacent said needle member and coaxially disposed in abutting relation with respect to said annular gasket, the outer end of said annular bushing being provided with a shallow coaxial bore, said bushing further being formed with a central, longitudinally-extending recess, an O-ring, and means controlled by the screwing of said valve cap in place upon said body member to inwardly swadge said annular ring portion for compressing said O-ring into said shallow coaxial bore for sealing off said longitudinally-extending recess.

6. A line tap valve as defined in claim 5 wherein said elongated needle member comprises a cylindrical body portion disposed centrally along its length, said body member through opening comprising a bore within which said needle member cylindrical body portion is slidably received for constraining said needle member to substantially coaxial movement within and along said body member.

7. A line tap valve as defined in claim 6 wherein said first annular shoulder is formed about the underside of said central body portion of said needle member.

8. A line tap valve as defined in claim 6 wherein said frusto-conical valve head portion is formed at the outer end of said central body portion of said needle member.

9. A line tap valve as defined in claim 6 wherein the outer end portion of said annular bushing is externally chamfered to define a frusto-conical outer wall portion against which said annular ring portion is swadged upon the screwing of said valve cap in place upon said body member.

* * * * *